United States Patent [19]

Campanella et al.

[11] 4,031,338
[45] June 21, 1977

[54] ECHO SUPPRESSOR USING FREQUENCY-SELECTIVE CENTER CLIPPING

[75] Inventors: Samuel Joseph Campanella, Gaithersburg, Md.; Hans Dodel, Alexandria, Va.; Henri George Suyderhoud, Potomac, Md.

[73] Assignee: Communications Satellite Corporation (COMSAT), Washington, D.C.

[22] Filed: Feb. 10, 1976

[21] Appl. No.: 656,903

[52] U.S. Cl. .................... 179/170.8; 179/170.2
[51] Int. Cl.² ............................... H04B 3/20
[58] Field of Search .......... 179/170.2, 170.6, 170.8

[56] References Cited
UNITED STATES PATENTS

| | | | |
|---|---|---|---|
| 3,567,873 | 3/1971 | Peroni | 179/170.2 |
| 3,585,311 | 6/1971 | Berkley et al. | 179/170.2 |
| 3,699,271 | 10/1972 | Berkley et al. | 179/170.6 |
| 3,784,747 | 1/1974 | Berkley et al. | 179/170.2 |
| 3,900,708 | 8/1975 | Bendel | 179/170.2 |

*Primary Examiner*—William C. Cooper
*Assistant Examiner*—Randall P. Myers
*Attorney, Agent, or Firm*—Sughrue, Rothwell, Mion, Zinn & Macpeak

[57] ABSTRACT

An echo suppressor for use in the send path of the four-wire part of a long distance telephone circuit employs frequency-selective center clipping. The bandwidth of the channel in which echo occurs is subdivided in contiguous bands or subchannels by appropriate filtering, and each resulting signal is center clipped by a center clipper. Threshold control voltages are predicted from knowledge of the average speech amplitude distribution characteristic as a function of frequency. This characteristic is subdivided into the same frequency bands as that used by the center clippers, and the ratios of energies in the bands are used to equalize the ratios of the control voltages that determine the center clipper thresholds. This technique is implemented through the use of a peak rectifier, the input of which is coupled to the receive path of the echo suppressor and the output of which is connected to each of the filtered subchannels by a resistive dividing network. The values of the resistances in each dividing network are determined so that the ratios of the various voltages appearing at these networks are proportional to the ratios of the average energies of the telephone speech in the respective frequency bands. These voltages are then applied to the center clippers to regulate each clipper threshold so that it is proportional to the applied voltages.

8 Claims, 6 Drawing Figures

ECHO SUPPRESSOR USING FREQUENCY-SELECTIVE CENTER CLIPPING

BACKGROUND OF THE INVENTION

1. Field of the Invention

The present invention generally relates to long distance telephone communication systems, and more particularly to the application of frequency-selective center clipping in echo suppressors for use in such communication systems.

2. Description of the Prior Art

In long distance telephone communications transmissions in opposite directions are carried over physically separated cable pairs. This separation of direction is called four-wire transmission. It will be appreciated that a four-wire network broadly defines separate send and receive paths, and these paths may be wireless, such as up and down links to a satellite. A commercial telephone instrument transmits and receives over the same pair of wires. Although such two-wire transmission is entirely satisfactory for local telephone calls, for long distance connections it is necessary to convert from two-wire transmission to four-wire transmission. This is typically accomplished by a hybrid transformer circuit. To prevent energy in the receive path from entering the send path, the net impedance and the impedance seen on the telephone side of the hybrid circuit must be very closely matched. The latter, however, varies from one telephone connection to another due to variation in the distances from subscriber' telephones to the hybrid circuit. Thus, a compromise net impedance can realize an average of only about 12 dB separation with a standard deviation of 3 dB between receive and transmit sides.

Due to the impedance imperfections in the conversion from two-wire transmission to four-wire transmission by the hybrid, some fraction of the signal energy originating from a source at one end is reflected at the other end. This is perceived as echo to the person who originated the signal and, due to the propogation time of the four-wire circuit in long-distance connections, the echo becomes very noticeable. This is an undesirable phenomenon and, as a result, voice-energy switched devices known as echo suppressors have been devised to prevent echo from occuring. Echo suppressors are placed in the four-wire part of the long distance circuit, one at each end. There are inherent limitations in the performance of circuits equipped with echo suppressors due to the design approach of voice switching. These limitations are particularly noticeable when both talkers speak simultaneously.

The basic principle of operation of most echo suppressors is based on blocking the echo signal by speech switching. This blocking of the echo signal is typically accomplished by a receive speech detector-amplifier whose output controls the insertion of a high loss in the transmit path. The major drawback of this technique is that it is applied to the full possible range of the signal amplitudes, even though echo signals are generally restricted well below that range because of the finite value of the echo return loss.

SUMMARY OF THE INVENTION

It is therefore an object of this invention to provide an improved echo suppressor for use in long distance telephone communications systems which selectively blocks signals at or below a given amplitude, but passes substantially unaffected those signals above this amplitude.

It is another objective of the invention to provide an improved echo suppressor for use in long distance communications which prevents echo signals from being heard for given values of the echo return loss without the disturbing side effects that conventional echo suppressors exhibit under the same circumstances of echo return loss.

Speech signal energy produced on telephone circuits is non-uniformly distributed over the frequency band of 300 to 3600 Hz. In addition, for any person at any time, this distribution is unlike that of any other person. Moreover, speech echo signals, like regular speech signals, are nonuniformly distributed in energy over the telephone bandwidth; however, the echo signal is lower in energy level than the regular speech signal. The principle of the invention lies in the division of the bandwidth of a telephone channel into a number of contiguous bands or subchannels and in the recognition that for two talkers at opposite ends to the telephone circuit, the probability is vanishingly small that the signal energies in each band are the same for both talkers.

Accordingly, the foregoing and other objects of the invention are obtained by providing filters to separate the signals into contiguous bands and center clippers, under the control of the receive path speech signal, to selectively remove the echo signal from the output of each filter without seriously affecting wanted speech. The signals in each band are again filtered and recombined after the center clipping process to eliminate odd-order harmonics generated by the process for speech signals exceeding the thresholds. The method employed by the invention for controlling the center clippers is based on the knowledge of average speech energy distribution as a function of frequency present in telephone channels.

Specifically, the invention contemplates the use of a peak rectifier connected to the receive path of a long distance telephone circuit and having an output connected to a plurality of resistive dividing networks. The ratios of the voltages appearing at these networks are proportional to the ratios of the average energies of the telephone speech in the contiguous bands. These voltages are then applied to the center clippers and regulate the threshold clipping level in each proportional to the applied voltages.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENTS

Figure 1:
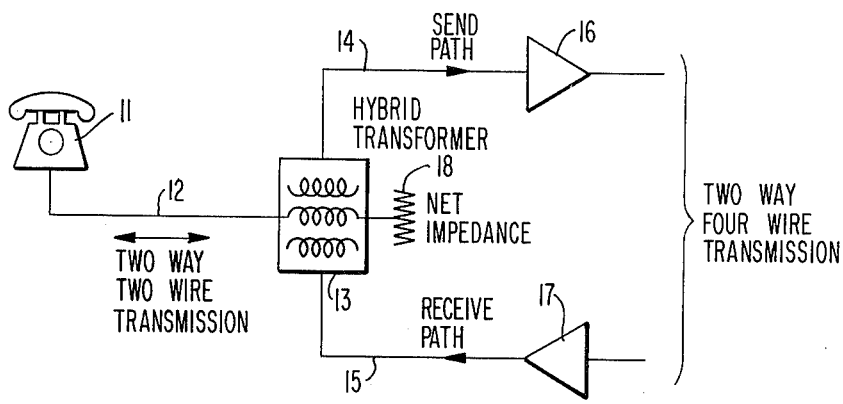
FIG. 1 illustrates a hybrid transformer used to separate, send and receive transmission paths in the conversion from local two-wire transmission to four-wire long distance circuits.

FIG. 1 of the drawings represents one end of a long distance telephone connection in which a subscriber's instrument 11 is connected by way of a two-wire transmission line 12 to a hybrid transformer 13 located at a long distance telephone exchange. The hybrid transformer 13 connects the local two-wire transmission circuit to a long distance four-wire transmission circuit comprising a send path 14 and a receive path 15. Each of these paths will typically have one or more repeater amplifiers 16 and 17, respectively, distributed therealong. The hybrid transformer 13 is provided with a net impedance 18 designed to match the telephone side of the hybrid circuit.

In order to prevent energy in the receive path 15 from entering the send path 14, the net impedance 18 and the impedance seen from the telephone side of the hybrid circuit 13 must be very closely matched. Because of the variation in distance between the hybrid circuit and various subscriber's instruments, it is not possible to match the net impedance 18 from one telephone connection to another. As a result, a compromise net impedance is typically employed, and the impedance mismatch due to this compromise permits some fraction of the signal energy in the receive path 15 to be transmitted to the send path 14 as a perceptible echo signal.

Figure 2:
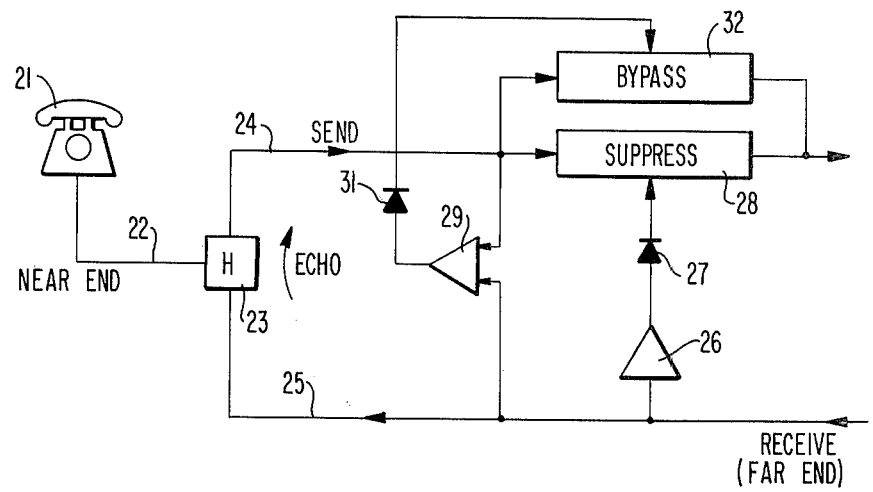
FIG. 2 illustrates the principle of prior art echo suppressor operation in long distance telephone communication circuits.

FIG. 2 shows the principle of operation of a prior art echo suppressor which is installed at a voice-frequency point in the four-wire connection. As before, a subscriber's instrument 22 is connected by a two-wire transmission line 22 to a hybrid circuit 23 which converts the two-wire transmission to a four-wire transmission represented by the send path 24 and the receive path 25. The echo suppressor includes a receive speech detector-amplifier comprising an amplifier 26 having as its input the signals on the receive path 25 and a rectifier 27 connected to the output of amplifier 26. The rectified output of the speech detector-amplifier is used to control the insertion of a high loss by the suppression circuit 28 in the send path 24 thereby blocking all signals in the send path including echo signals. Since the suppression circuit 28 will block the transmission of any echo signal that may appear on the send path 24, this process is known as echo suppression.

A problem occurs in this system when the party at the near end is talking at the same time as the party at the far end. Under these circumstances the high loss inserted by the suppression circuit 28 in the send path 24 must be removed in order to avoid seizure of the circuit by one party. This is typically accomplished by the use of a differential amplifier 29 which receives input signals from both the send and receive paths 24 and 25. The output of differential amplifier 29 is rectified by a rectifier 31 and used to enable a bypass circuit 32 connected in parallel with the suppressor 28. However, when the suppressor 28 is bypassed, echo is also permitted in the send path 24.

Figure 3:
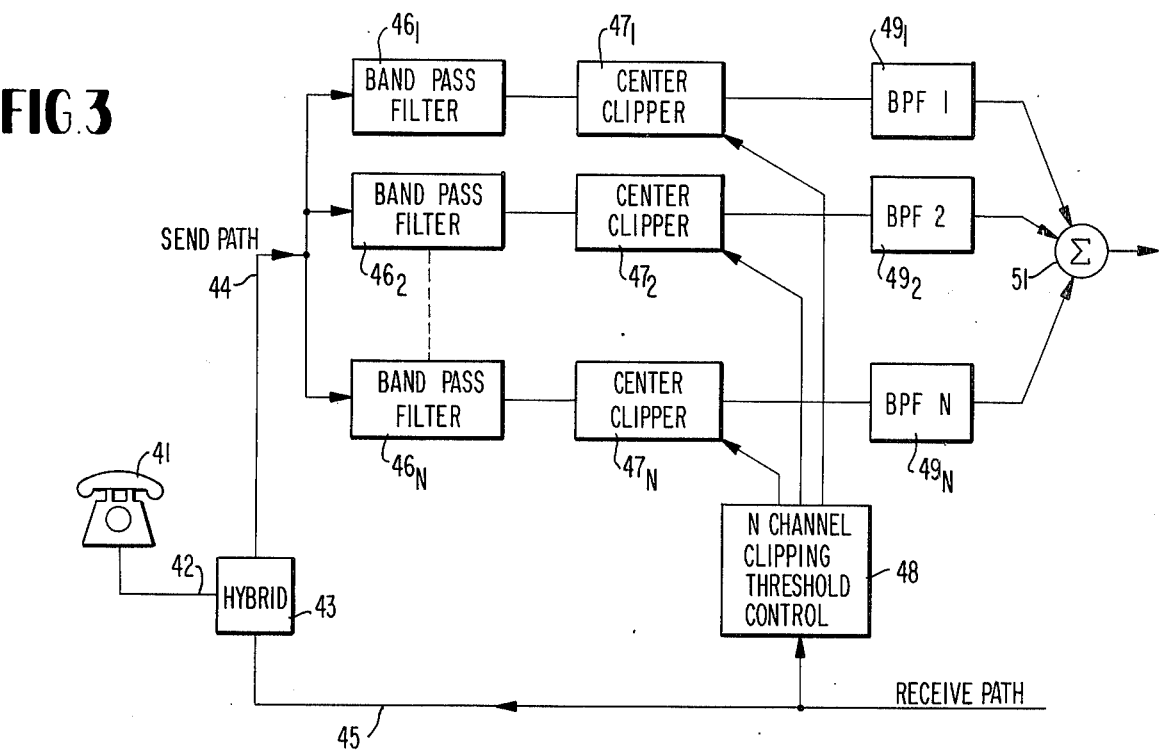
FIG. 3 is a block diagram illustrating the principle of operation of the present invention.

The present invention is based on the recognition that, if the speech signal in the send path were divided into contiguous frequency bands, the signal energy distribution within each band during simultaneous transmission by both talkers will not be equal in the contiguous bands, and the undesired echo signal in the send path will be lower in energy level than the desired speech signal. Thus, if filters are used to separate the signals in the send path into contiguous bands, and if center clippers under control of the speech signals in the receive paths are utilized at the output of each filter, then the echo can be selectively removed without seriously affecting wanted speech. This process is illustrated in FIG. 3 of the drawings where, as before, the subscriber's instrument 41 is shown as connected by way of a two-wire transmission line 42 to the hybrid circuit 43 at the telephone exchange. The hybrid circuit 43 connects the two-wire transmission circuit to a four-wire transmission circuit consisting of a send path 44 and a receive path 45. The signal in the send path 44 is divided into N contiguous bands by a plurality of bandpass filters $46_1$ through $46_N$. The output of each of the bandpass filters $46_1$ through $46_N$ is connected to a respective center clipper $47_1$ through $47_N$. Center clipping as a general technique is simply the process whereby a signal is reduced to 0 or a reference level whenever its instantaneous absolute value is at or below a predetermined threshold. Each of the center clippers $47_1$ to $47_N$ has a threshold determined by the N channel threshold clipping control circuit 48 connected to the receive path 45. The outputs of the center clippers $47_1$ to $47_N$ are connected to respective bandpass filters $49_1$ to $49_N$, which in this generalized embodiment are identical to filters $46_1$, to $46_N$. The outputs of filters $49_1$ to $49_N$ are recombined in the summing junction 51. The filtering provided by the bandpass filters $49_1$ to $49_N$ prior to recombination is necessary because of odd-order harmonics generated by the center clipping process for speech signals exceeding the thresholds.

Figure 4:
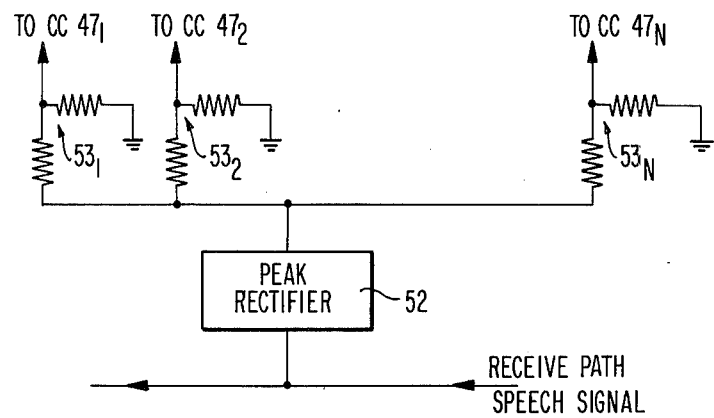
FIG. 4 is a simplified schematic diagram of the clipping threshold control used in the system of FIG. 3.

The invention is particularly directed to the method of controlling the thresholds of the center clippers by the threshold control 48. It is a simple method and is based on knowledge of the average speech energy distribution as a function of frequency present in telephone channels. FIG. 4 illustrates a simplified schematic diagram of the threshold control 48. It consists of a peak rectifier 52 which rectifies the speech signals in the receive path. The output of rectifier 52 is branched N ways by resistive dividing networks $53_1$ to $53_N$. The ratios of the resistances of each pair of resistors forming each network are chosen such that the voltages appearing at the outputs of the resistive dividing networks $53_1$ through $53_N$ are proportional to the known average energies of telephone speech in the N contiguous bands. This is explained more fully below in connection with FIG. 6 and the specific implementation illustrated in FIG. 5. These voltages are then applied to the center clippers to regulate the threshold of each proportional to its applied voltage.

Figure 5:
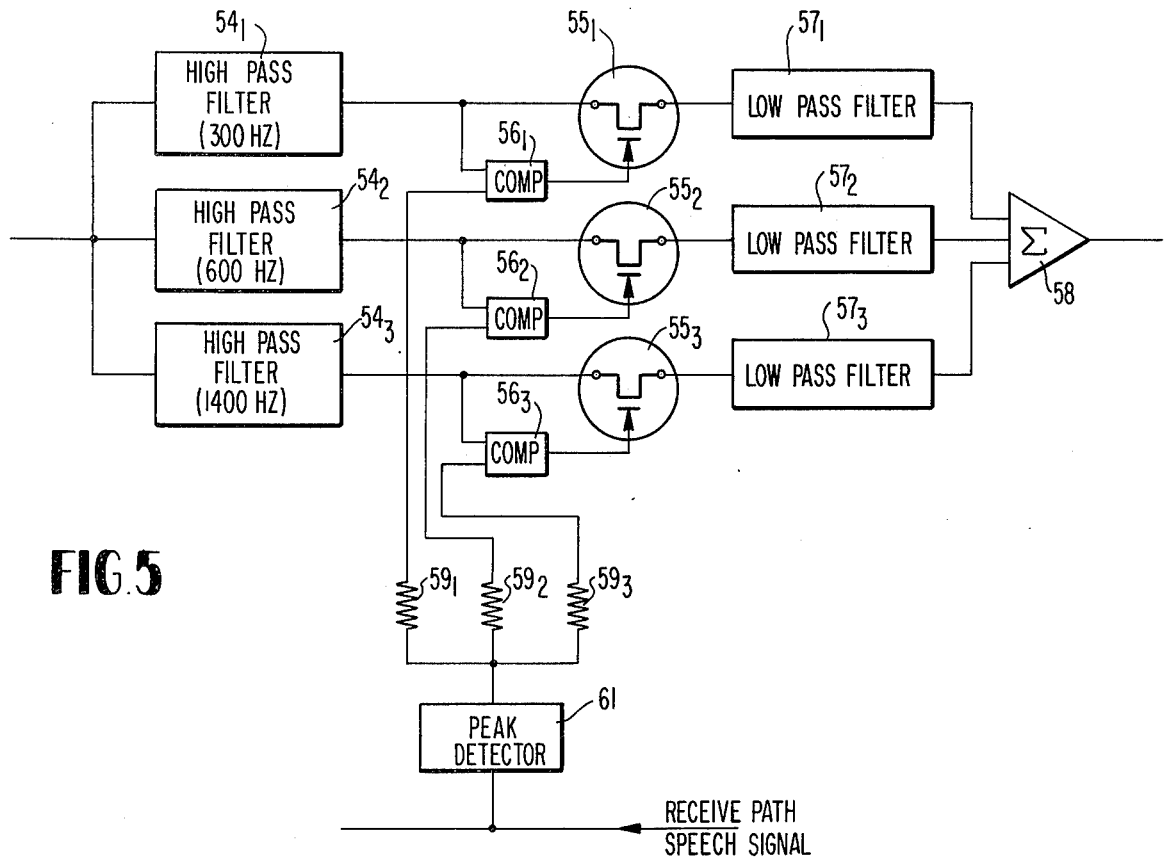
FIG. 5 illustrates a particular implementation employing three contiguous bands.

A particular implementation of the invention is shown in FIG. 5 wherein the suppressor circuit employs signals in three contiguous bands, respectively from 300 to 600 Hz, 600 to 1400 Hz, and 1400 to 3600 Hz. In this embodiment of the invention, three high pass filters $54_1$, $54_2$ and $54_3$ having corner frequencies at 300, 600 and 1400 Hz are employed in the send path of the circuit. Each of these high pass filters is followed by a center clipper comprising, respectively switches $55_1$, $55_2$, and $55_3$ controlled by associated comparators $56_1$, $56_2$ and $56_3$. The comparators $56_1$, $56_2$ and $56_3$ receive inputs from high pass filters $54_1$, $54_2$ and $54_3$ and resistors $59_1$, $59_2$ and $59_3$, respectively. The magnitudes of the signal voltages appearing at the outputs of filters $54_1$, $54_2$ and $54_3$ are detected and compared with the voltages supplied by resistors $59_1$, $59_2$ and $59_N$ by the comparators $56_1$, $56_2$ and $56_N$ to produce control voltages for the switches $55_1$, $55_2$ and $55_3$. Each switch $55_1$, $55_2$ or $55_3$ is connected in series with a low pass filter $57_1$, $57_2$ or $57_3$, respectively, with cutoff frequencies at values well below the third harmonics of the corner frequencies of their preceeding high pass filters. It will be appreciated by those skilled in the art that the series combination of a high pass filter having a corner frequency of, for example, 300 Hz and a low pass filter having a cutoff frequency of, for example, 650 Hz is the full equivalent of a bandpass filter having a bandpass of 300 to 650 Hz. Moreover, the low pass filters $57_1$, $57_2$ and $57_3$ serve the same function as the bandpass filters $49_1$ to $49_N$ in FIG. 3 by eliminating odd-order harmonics generated by the center clipping process. The outputs of the low pass filters $57_1$, $57_2$ and $57_3$ are summed in a summing amplifier 58 which recombines the signal after the center clipping process.

In the implementation as illustrated in FIG. 5 the center clipper switches $55_1$, $55_2$ and $55_3$ may take the form of field-effect transistors having their source and drain electrodes connected in series between their respective high pass and low pass filters. The gate electrode is connected to the respecrive comparator $56_1$, $56_2$ or $56_3$. Each of the resistors $59_1$, $59_2$ and $59_3$, which provide the threshold voltages to comparators $56_1$, $56_2$ and $56_3$, respectively, will be recognized as one of the pair of resistors comprising the voltage dividers $53_1$ to $53_N$ in FIG. 4. The second resistors of each pair are constituted by the input resistances of comparators $56_1$, $56_2$ and $56_3$. These resistive voltage dividers are connected to the output of a peak detector 61 which receives as its input the signal on the receive path.

Figure 6:
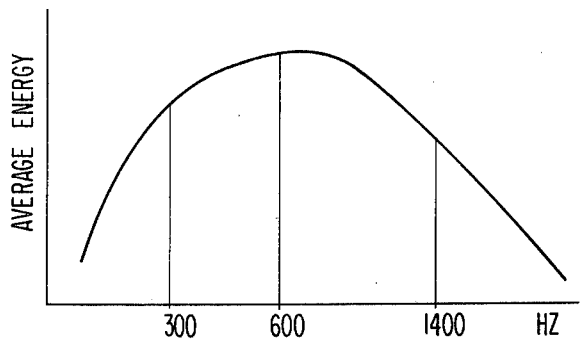
FIG. 6 is a graph illustrating the manner in which the control signals for the center clippers are derived for the implementation illustrated in FIG. 5.

The graph shown in FIG. 6 illustrates the average speech energy distribution over the frequency bands. This energy distribution is used to determine the values of the resistors $59_1$, $59_2$ and $59_3$. For example, if the average energy of a speech signal in the frequency band from 300 to 600 Hz is determined to be approximately 15 percent greater than that of a speech signal in the frequency band from 600 to 1400 Hz, then the value of the resistor 59 should be only 87 percent of the value resistor $59_3$. This is due to the inverse relationship between the output voltage of the voltage divider and the resistance of the first resistor of voltage divider pair of resistors for given values of input voltages and resistance of the second resistor. The resulting threshold voltages at the outputs of the respective voltage dividers are subtracted from the magnitudes of the signals in the sub-channels of the send path to produce control voltages for each of the three center clipper switches. Thus, for example, the threshold voltage developed at the output of resistor $59_1$ is subtracted from the magnitude of the output signal from high pass filter $54_1$ by the comparator $56_1$. If the result of the subtraction is positive, a control voltage causes the switch $55_1$ to be closed, thereby passing the output signal from filter $54_1$; however, if the result is negative, the control voltage causes the switch to open and block the output of filter $54_1$. This action assures the center clipping process.

The specific implementation illustrated in FIG. 5 has been subjectively compared with a conventional speech switched echo suppressor of the type illustrated in FIG. 2. When the echo return loss (ERL) was 16 dB the implementation of the invention shown in FIG. 5 performed superior to the speech switched echo suppressor; when the ERL was 11 dB, the two devices performed equally as well; and when the ERL was as low as 6 dB (which rarely occurs in the telephone exchange), some degradation in performance was noticeable in the implementation illustrated in FIG. 5. Even better results can be expected if the signal in the send path is divided into a greater number of contiguous frequency bands.

It will therefore be apparent that the embodiments shown are only exemplary and that various modifications can be made in construction and arrangement within the scope of the invention as defined in the appended claims.

We claim:

1. An echo suppressor for use in long distance telephone speech communication systems having a send path and a receive path, comprising:
   a first plurality of filter networks connected in said send path for dividing a band width of the send path into a like plurality of contiguous frequency bands;
   a plurality of center-clipping networks connected to the outputs of said first plurality of filter networks on a one-to-one basis, said center-clipper networks being operative to reduce to zero a signal applied thereto whenever the signal's instantaneous absolute level is at or below a threshold level;
   summing means connected to receive the outputs of all of said center-clipper networks and providing a combined output signal; and
   threshold control means connected to receive a signal in said receive path to detect the overall peak signal level of said signal, said threshold control means producing a plurality of threshold control signals in response to the detected overall peak signal level of a signal in said receive path which control signals are applied to respective ones of said center-clipper networks, the ratios of said threshold control signals produced by said control means being determined by the ratios of the predetermined average energy of the telephone speech in said plurality of frequency bands.

2. An echo suppressor as recited in claim 1 further comprising a second plurality of filter networks, each corresponding to a complementary one of said first plurality and connected in series between said center-clipper networks and said summing means for eliminating odd-order harmonics generated by the operation of said center-clipper networks.

3. An echo suppressor as recited in claim 2 wherein each of said first and second plurality of filter networks comprise a plurality of bandpass filters.

4. An echo suppressor as recited in claim 2 wherein said first plurality of filter networks comprise a plurality of high pass filters and said second plurality of filter networks comprise a plurality of low pass filters.

5. An echo suppressor as recited in claim 1 wherein said threshold control means includes:
   a peak detector for generating an output voltage proportional to the instantaneous peak amplitude of a signal in said send path; and
   a plurality of branching resistive networks connected at one end to the output of said peak detector and at the other end to respective ones of said center-clipper networks, the value of the resistances in each of said resistive networks being determined so that the ratios of the voltages appearing at said center-clipper networks are proportional to the ratios of the predetermined average energy of the telephone speech in said contiguous frequency bands.

6. An echo suppressor as recited in claim 5 wherein said center-clipper networks each comprise:
switch means connected in series between one of said first plurality of filter networks and one of said second plurality of filter networks; and
comparator means having as one input the output of said one of set first plurality of filter networks and as the other input the output of the corresponding resistive network and producing an output for controlling the operation of said switch means depending on the polarity of the difference of the two inputs.

7. An echo suppressor for use in long distance telephone speech communications systems having a send path and a receive path comprising:
means for dividing the speech signals in said send path into a plurality of contiguous frequency bands,
means responsive to the overall peak signal level of speech signals in said receive path for selectively suppressing the speech signals in each of said contiguous frequency bands according to a comparison of the send path signal level in respective contiguous frequency bands with the respective threshold established by the predetermined average speech energy distribution as a function of frequency, and
means for combining the selectively suppressed speech signals into a single signal substantially free of echo signals.

8. A method of echo suppression in long distance telephone speech communication systems comprising:
separating the speech signals to be transmitted into a plurality of contiguous frequency bands,
detecting the overall peak signal level of received speech signals,
selectively suppressing the signals in each of the contiguous frequency bands according to a comparison of the send path signal level in respective contiguous frequency bands with the respective thresholds established by the predetermined average speech energy distribution as a function of frequency and the detected overall peak signal level of the received speech signals, and
combining the selectively suppressed speech signals into a single signal substantially free of echo signals.

* * * * *